(12) United States Patent
Klein et al.

(10) Patent No.: US 10,955,164 B2
(45) Date of Patent: Mar. 23, 2021

(54) DEHUMIDIFICATION CONTROL SYSTEM

(71) Applicant: Ademco Inc., Golden Valley, MN (US)

(72) Inventors: Aaron Klein, Rochester, MN (US);
Robert Schnell, Plymouth, MN (US);
David Schultz, Savage, MN (US)

(73) Assignee: Ademco Inc., Golden Valley, MN (US)

( * ) Notice: Subject to any disclaimer, the term of this patent is extended or adjusted under 35 U.S.C. 154(b) by 10 days.

(21) Appl. No.: 15/210,525

(22) Filed: Jul. 14, 2016

(65) Prior Publication Data

US 2018/0017278 A1    Jan. 18, 2018

(51) Int. Cl.
| | | |
|---|---|---|
| *F24F 11/77* | (2018.01) |
| *F24F 11/30* | (2018.01) |
| *F24F 11/62* | (2018.01) |
| *F24F 3/14* | (2006.01) |
| *F24F 140/50* | (2018.01) |
| *F24F 11/52* | (2018.01) |
| *F24F 11/58* | (2018.01) |
| *F24F 110/20* | (2018.01) |
| *F24F 120/20* | (2018.01) |
| *F24F 110/10* | (2018.01) |

(52) U.S. Cl.
CPC ............. *F24F 11/77* (2018.01); *F24F 11/30* (2018.01); *F24F 11/62* (2018.01); *F24F 3/1405* (2013.01); *F24F 11/52* (2018.01); *F24F 11/58* (2018.01); *F24F 2003/144* (2013.01); *F24F 2110/10* (2018.01); *F24F 2110/20* (2018.01); *F24F 2120/20* (2018.01); *F24F 2140/50* (2018.01)

(58) Field of Classification Search
CPC ........ F24F 11/0001; F24F 11/30; F24F 11/50; F24F 11/52; F24F 11/62; F24F 11/63; F24F 11/64; F24F 11/65; F24F 11/70; F24F 11/74; F24F 11/745; F24F 11/755; F24F 11/76; F24F 11/77; F24F 2110/10; F24F 2110/20; F24F 2120/20; F24F 2140/50; F25B 2600/11; F25B 2600/112
See application file for complete search history.

(56) References Cited

U.S. PATENT DOCUMENTS

| | | |
|---|---|---|
| 4,257,238 A | 3/1981 | Kountz et al. |
| 4,783,970 A | 11/1988 | Takahashi |
| (Continued) | | |

FOREIGN PATENT DOCUMENTS

| | | |
|---|---|---|
| CN | 100366984 C | 2/2008 |
| CN | 100430662 C | 11/2008 |
| (Continued) | | |

OTHER PUBLICATIONS

Khattar, "Air Conditioner Fan Speed Controller for Comfort and Dehumidification," Florida Solar Energy Center, 3 pages, downloaded Jun. 3, 2016.

*Primary Examiner* — Tavia Sullens
(74) *Attorney, Agent, or Firm* — Shumaker & Sieffert, P.A.

(57) ABSTRACT

Systems, assemblies, and methods include features for selecting a fan speed priority setting to facilitate dehumidification of a space while maintaining a comfortable temperature in the building across a range of cooling loads. In one example, an electronic assembly may operate a multi-speed fan at a lower fan speed or higher fan speed based, at least in part, on a current cooling load on the cooling system of the building and a dehumidification high fan speed priority setting entered by a user.

14 Claims, 10 Drawing Sheets

(56) References Cited

U.S. PATENT DOCUMENTS

| | | |
|---|---|---|
| 4,873,649 A | 10/1989 | Grald et al. |
| 5,062,276 A | 11/1991 | Dudley |
| 5,303,561 A | 4/1994 | Bahel et al. |
| 5,426,951 A | 6/1995 | Yamashita et al. |
| 5,572,878 A | 11/1996 | Kapoor et al. |
| 5,628,201 A | 5/1997 | Bahel et al. |
| 5,823,004 A | 10/1998 | Polley et al. |
| 6,012,296 A | 1/2000 | Shah |
| 6,070,110 A | 5/2000 | Shah et al. |
| 6,185,958 B1 | 2/2001 | Wightman |
| 6,223,543 B1 | 5/2001 | Sandelman |
| 6,314,747 B1 | 11/2001 | Wightman |
| 6,389,823 B1 | 5/2002 | Loprete et al. |
| 6,393,851 B1 | 5/2002 | Wightman |
| 6,397,629 B2 | 6/2002 | Wightman |
| 6,401,470 B1 | 6/2002 | Wightman |
| 6,401,471 B1 | 6/2002 | Wightman |
| 6,560,980 B2 | 5/2003 | Gustafson et al. |
| 6,581,398 B2 | 6/2003 | Wightman |
| 6,644,052 B1 | 11/2003 | Wightman |
| 6,751,970 B2 | 6/2004 | Wightman |
| 6,857,281 B2 | 2/2005 | Wightman |
| 6,892,547 B2 | 5/2005 | Strand |
| 6,915,648 B2 | 7/2005 | Wightman |
| 6,951,117 B1 | 10/2005 | Wightman |
| 6,968,707 B2 | 11/2005 | Violand et al. |
| 7,062,930 B2 | 6/2006 | Rayburn |
| 7,191,604 B1 | 3/2007 | Wiggs |
| 7,225,627 B2 | 6/2007 | Wightman |
| 7,234,312 B2 | 6/2007 | Violand et al. |
| 7,475,559 B2 | 1/2009 | Gleeson |
| 7,726,140 B2 | 6/2010 | Rayburn et al. |
| 7,740,184 B2 | 6/2010 | Schnell et al. |
| 7,784,293 B2 | 8/2010 | Violand et al. |
| 7,793,510 B2 | 9/2010 | Perry et al. |
| 7,893,635 B2 | 2/2011 | Hood, III et al. |
| 7,946,123 B2 | 5/2011 | Tolbert, Jr. et al. |
| 7,975,495 B2 | 7/2011 | Voorhis et al. |
| 8,082,751 B2 | 12/2011 | Wiggs |
| 8,109,110 B2 | 2/2012 | Wiggs |
| 8,364,318 B2 | 1/2013 | Grabinger et al. |
| 8,397,522 B2 | 3/2013 | Springer et al. |
| 8,402,780 B2 | 3/2013 | Wiggs |
| 8,468,842 B2 | 6/2013 | Wiggs |
| 8,483,996 B2 | 7/2013 | Patel et al. |
| 8,601,828 B2 | 12/2013 | Moseley |
| 8,650,894 B2 | 2/2014 | Tolbert, Jr. |
| 8,672,642 B2 | 3/2014 | Tolbert, Jr. et al. |
| 8,689,574 B2 | 4/2014 | Uselton |
| 8,776,543 B2 | 7/2014 | Wiggs |
| 8,790,089 B2 | 7/2014 | Moody et al. |
| 8,833,098 B2 | 9/2014 | Wiggs |
| 8,863,536 B1 | 10/2014 | Perry et al. |
| 8,904,814 B2 | 12/2014 | Tolbert, Jr. et al. |
| 8,931,295 B2 | 1/2015 | Wiggs |
| 8,997,509 B1 | 4/2015 | Wiggs |
| 9,080,805 B2 | 7/2015 | Yanagida et al. |
| 9,127,870 B2 | 9/2015 | Wightman |
| 2004/0089002 A1 | 5/2004 | Rayburn |
| 2004/0154321 A1 | 8/2004 | Strand |
| 2005/0022541 A1 | 2/2005 | Rayburn et al. |
| 2005/0115258 A1 | 6/2005 | Violand et al. |
| 2005/0235666 A1 | 10/2005 | Springer et al. |
| 2006/0064996 A1 | 3/2006 | Violand et al. |
| 2006/0260334 A1 | 11/2006 | Carey et al. |
| 2007/0037507 A1 | 2/2007 | Liu |
| 2007/0062685 A1 | 3/2007 | Patel et al. |
| 2007/0151280 A1 | 7/2007 | Wiggs |
| 2007/0227168 A1 | 10/2007 | Simmons |
| 2007/0227177 A1 | 10/2007 | Leon et al. |
| 2007/0227178 A1 | 10/2007 | Leon et al. |
| 2007/0289322 A1 | 12/2007 | Mathews |
| 2008/0029611 A1 | 2/2008 | Schnell et al. |
| 2008/0041075 A1 | 2/2008 | Violand et al. |
| 2008/0135635 A1 | 6/2008 | Deng et al. |
| 2008/0264085 A1 | 10/2008 | Perry et al. |
| 2008/0315000 A1 | 12/2008 | Gorthala et al. |
| 2009/0032236 A1* | 2/2009 | Geadelmann ......... F24F 1/0007 236/46 R |
| 2009/0065173 A1 | 3/2009 | Wiggs |
| 2009/0095442 A1 | 4/2009 | Wiggs |
| 2009/0120120 A1 | 5/2009 | Wiggs |
| 2009/0266091 A1 | 10/2009 | Tolbert, Jr. |
| 2009/0277617 A1 | 11/2009 | Hood, III et al. |
| 2009/0324426 A1 | 12/2009 | Moody et al. |
| 2009/0324427 A1 | 12/2009 | Tolbert, Jr. et al. |
| 2009/0324428 A1 | 12/2009 | Tolbert, Jr. et al. |
| 2010/0083680 A1 | 4/2010 | Tolbert, Jr. et al. |
| 2010/0107668 A1 | 5/2010 | Voorhis et al. |
| 2010/0204838 A1 | 8/2010 | DiPaolo et al. |
| 2010/0212879 A1 | 8/2010 | Schnell et al. |
| 2010/0236262 A1 | 9/2010 | Lifson et al. |
| 2011/0263193 A1 | 10/2011 | Patel et al. |
| 2012/0047932 A1 | 3/2012 | Yanagida et al. |
| 2012/0267091 A1* | 10/2012 | Myers .................. F28F 27/003 165/279 |
| 2013/0226352 A1 | 8/2013 | Dean-Hendricks et al. |
| 2015/0105919 A1 | 4/2015 | Chamorro et al. |

FOREIGN PATENT DOCUMENTS

| | | |
|---|---|---|
| CN | 100436954 C | 11/2008 |
| CN | 102317694 B | 10/2014 |
| EP | 0540874 A2 | 5/1993 |
| EP | 1443278 B1 | 2/2007 |
| EP | 1443279 B1 | 4/2007 |
| EP | 1443280 B1 | 4/2007 |
| EP | 1398576 B1 | 12/2010 |
| EP | 2527754 B1 | 7/2014 |
| EP | 2772699 A1 | 9/2014 |
| FR | 3017200 A1 | 8/2015 |
| FR | 3017201 A1 | 8/2015 |
| WO | 2010093846 A1 | 8/2010 |
| WO | 2012177072 A2 | 12/2012 |
| WO | 2015118232 A1 | 8/2015 |

* cited by examiner

DEHUMIDIFICATION CONTROL SYSTEM

TECHNICAL FIELD

This present disclosure pertains to Heating, Ventilation, and/or Air Conditioning (HVAC) systems. More particularly, the present disclosure pertains to HVAC controllers and control of dehumidification within a space environmentally controlled by an HVAC controller.

BACKGROUND

Heating, Ventilation, and/or Air Conditioning (HVAC) systems are often used to control the comfort level within a building or other structure. Such HVAC systems typically include an HVAC controller that controls various HVAC components of the HVAC system in order to affect and/or control one or more environmental conditions within the building. In some cases, an HVAC system may include a cooling system with a multi-speed fan. To reduce the humidity level in the building, the speed of the multi-speed fan may be reduced, which slows the flow of air across the cooling coils, which lowers the temperature of the air and increases the condensation of water from the air. The result is conditioned air that is cooler and less humid than if the multi-speed fan were operated at a higher fan speed. A difficulty that can occur in such systems is that when operating at the lower fan speed to reduce humidity, the fan speed is too low to effectively drive conditioned air to the far reaches of the building. This can leave some areas of the building not sufficiently cooled and thus uncomfortable to the occupants. This undesirable effect can increase as the cooling load on the building increases. What would be desirable is a system that can achieve reduced humidity using the cooling system of the building while also maintaining a comfortable temperature in the building at increased cooling loads.

SUMMARY

This disclosure relates to electronic assemblies/devices such as HVAC controller devices that provide improved dehumidification using a cooling system of a building while maintaining a comfortable temperature in the building.

In some instances, systems, assemblies, and methods disclosed herein may include, among other features, features for selecting a fan speed priority setting to facilitate dehumidification of a space while maintaining a comfortable temperature in the building. Illustratively, an electronic assembly may be configured to adjust a fan speed of a multi-speed fan of a cooling system for a building to reduce the humidity level in a building. The electronic assembly may include a controller (e.g., a processor), a memory, and a user interface, where the memory and the user interface may be operatively coupled to the controller. The user interface may be configured to accept a high fan speed priority setting from a user. The controller may determine whether to operate the multi-speed fan of the cooling system at a lower fan speed or higher fan speed based, at least in part, on two or more factors. In one example, the controller of the electronic assembly may operate the multi-speed fan at a lower fan speed or higher fan speed based, at least in part, on a current cooling load on the cooling system of the building and the high fan speed priority setting entered by the user via the user interface.

In one example, the electronic assembly may be an HVAC controller configured to adjust a fan speed of a dual speed fan of an HVAC system between a low fan speed and a high fan speed. In this example, the HVAC controller may include a controller (e.g., a processor), memory, and a user interface, where the memory and the user interface are operatively coupled to the controller. The user interface may be configured to display a high fan speed priority selection screen and receive a selection of a high fan speed priority setting via the high fan speed priority setting selection screen. The controller may be configured to identify a current cooling load on a cooling system of the HVAC system and adjust the fan speed of the dual speed fan to the high fan speed when the identified current cooling load on the cooling system goes beyond a cooling load threshold. The cooling load threshold may be dependent at least in part on the selected high fan speed priority setting.

The assemblies and controllers disclosed herein may be used in methods of adjusting a fan speed of a multi-speed fan of a cooling system for a building. An example method may include receiving a high fan speed priority setting via a user interface and determining whether the multi-speed fan is to be operate at a lower fan speed or a higher fan speed. In some cases, determining whether the multi-speed fan is to operate at a lower fan speed or a higher fan speed may be based, at least in part, on a current cooling load on the cooling system and the high fan speed priority setting.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various embodiments in connection with the accompanying drawings, in which.

Figure 1:
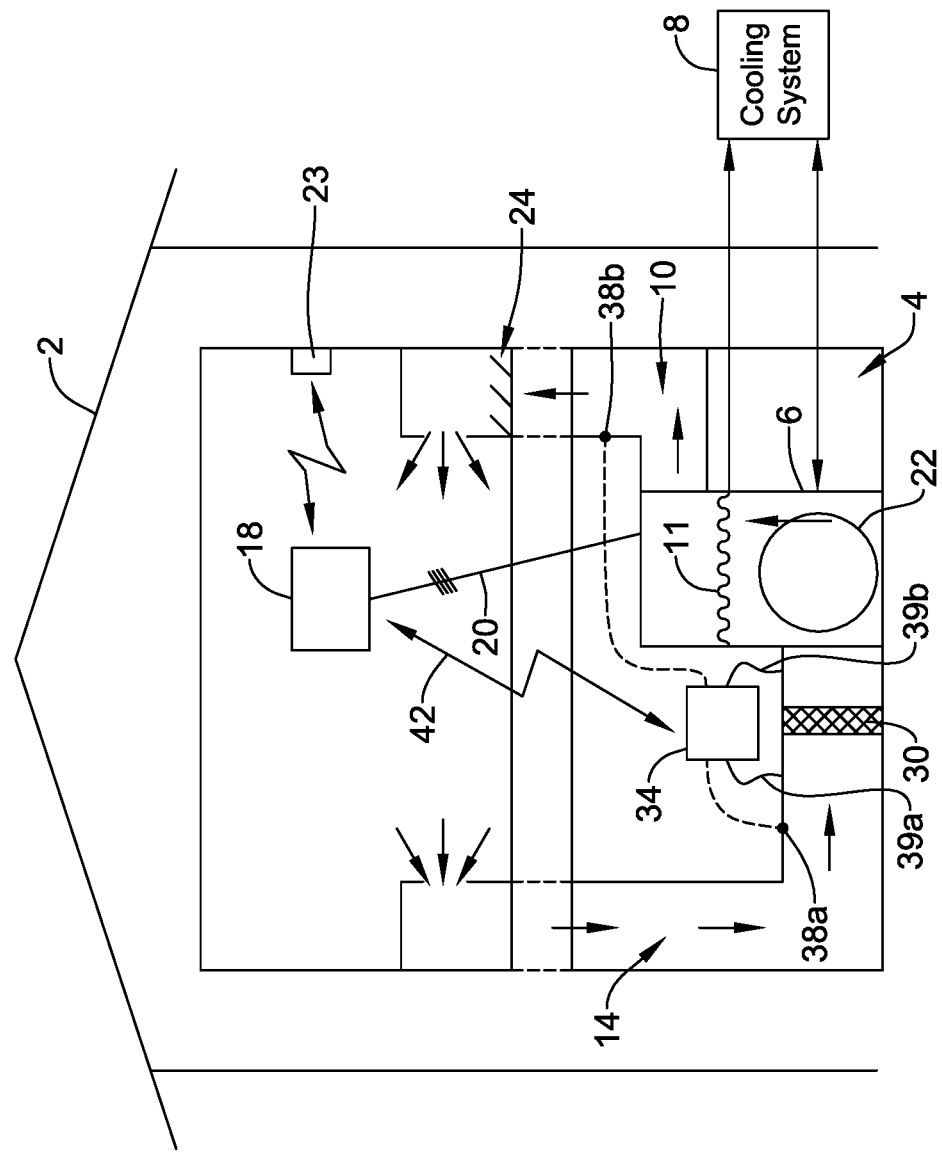
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative in nature.

For convenience, the present disclosure may be described using relative terms including, for example, left, right, top, bottom, front, back, upper, lower, up, and down, as well as others. It is to be understood that these terms are merely used for illustrative purposes and are not meant to be limiting in any manner.

Within this disclosure, the terms "thermostat", "programmable thermostat", "WiFi enabled thermostat", "HVAC controller", and "device" may refer to an HVAC controller when the context makes clear that reference to the thermostat as a whole is intended. Other devices, such as cell phones, computers, tablets, readers, fobs, and other devices, which may communicate with the thermostat directly or indirectly, may be identified more fully. Although reference may be made to a programmable thermostat in portions of the description that follows, it should be appreciated that each of those descriptions may also apply to a programmable thermostat which may be expressly WiFi enabled even when the feature or features described do not expressly mention or require a communication link such as a WiFi connection. It will also be appreciated that exemplary descriptions of user interactions with program code which refer to user interface features commonly specific to mobile devices, for example touch screen gestures of cell phones or tablets, may be accomplished within other programming environments by other interaction means, for example track pads, track balls, mice, and the like of personal computers.

When performing dehumidification inside of a building (e.g., a home or other building), cooling equipment may be used to dehumidify the space. To reduce the humidity level in the building, the speed of a multi-speed fan may be reduced, which slows the flow of air across the cooling coils, which lowers the temperature of the air and increases the condensation of water from the air. The result is conditioned air that is cooler and less humid than if the multi-speed fan were operated at a higher fan speed. A difficulty that can occur in such systems is that when operating at the lower fan speed to reduce humidity, the fan speed is too low to effectively drive conditioned air to the far reaches of the building. This can leave some areas of the building not sufficiently cooled and thus uncomfortable to the occupants. This undesirable effect can increase as the cooling load on the building increases. To help alleviate this, during dehumidification, the current cooling load on the cooling system may be identified, and the fan speed may be adjusted to a higher fan speed as the identified current cooling load goes up. The cooling load on the building may go up, for example, when moving from the morning hours to the afternoon hours during a day. In some cases, the fan speed may be adjusted to a higher fan speed when the current cooling load rises above a cooling load threshold. In some cases, the cooling load threshold may be dependent at least in part on a user specified high fan speed priority setting. If the cooling load on the building subsequently decreases, such as when moving from the afternoon hours to the evening hours, the fan speed may be adjusted downward to increase dehumidification.

FIG. 1 is a schematic view of a building 2 having an illustrative heating, ventilation, and/or air conditioning (HVAC) system 4. The illustrative HVAC system 4 includes a heating system 6 and a cooling system 8. While FIG. 1 shows a typical forced air type HVAC system, other types of HVAC systems are contemplated including, but not limited to, boiler systems, radiant heating systems, electric heating systems, heat pump systems, and/or any other suitable type of HVAC system, as desired. The illustrative HVAC system 4 of FIG. 1 includes one or more HVAC components 6 and 8, a system of ductwork and air vents including a supply air duct 10 and a return air duct 14, and one or more HVAC controllers 18 (e.g., an electronic assembly) configured to adjust operation of the HVAC components 6. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, a fan (e.g., one or more single speed fans and/or multi-speed fans), and/or the like.

It is contemplated that the HVAC controller(s) 18 may be configured to control the comfort level in the building or structure by activating and deactivating the HVAC component(s) 6 and 8 in a controlled manner. The HVAC controller(s) 18 may be configured to control the HVAC component(s) 6 and 8 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure. In some cases, the HVAC controller(s) 18 may include a wall module that includes a user interface for interacting with a user, but does not include control circuitry to control the HVAC system 4. Instead, the wall module is operatively coupled to an HVAC Controller or EIM module that provides the necessary control signals to control the HVAC system 4.

In the illustrative HVAC system 4 shown in FIG. 1, the HVAC component(s) 6 and 8 may provide heated air and/or cooled air via the ductwork throughout the building 2. As illustrated, the HVAC component(s) 6 and 8 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool and/or dehumidification call signal is provided by the HVAC controller(s) 18, an HVAC component 8 (e.g. air conditioning unit) may be activated to cool a cooling coil 11 to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14.

To reduce the humidity level in the building 2, the speed of a multi-speed blower or fan 22 may be reduced, which slows the flow of air across the cooling coil 11, which lowers the temperature of the air and increases the condensation of water from the air. The result is conditioned air that is cooler and less humid than if the multi-speed fan 22 were operated at a higher fan speed. A difficulty that can occur in such HVAC systems is that when operating at the lower fan speed to reduce humidity, the fan speed is too low to effectively drive conditioned air through the ducts 14 to the far reaches of the building 2. This can leave some areas of the building 2 not sufficiently cooled and thus uncomfortable to the occupants. This undesirable effect can increase as the cooling load on the building 2 increases. To help alleviate this, during dehumidification, the current cooling load on the cooling system 8 may be identified, and the fan speed of the blower or fan 22 may be adjusted to a higher fan speed as the identified current cooling load goes up. The cooling load on the building 2 may go up, for example, when moving from the morning hours to the afternoon hours during a day. In some cases, the fan speed of the blower or fan 22 may be adjusted to a higher fan speed when the current cooling load rises above a cooling load threshold. In some cases, the cooling load threshold may be dependent at least in part on a user specified high fan speed priority setting. If the cooling load on the building 2 subsequently decreases, such as when moving from the afternoon hours to the evening hours, the fan speed of the blower or fan 22 may be adjusted downward to increase dehumidification.

In some cases, the system of vents or ductwork 10 and/or 14 may include one or more dampers 24 to regulate the flow of air, but this is not required. For example, one or more dampers 24 may be coupled to one or more HVAC controller(s) 18, and can be coordinated with the operation of one or more HVAC components 6 and 8. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6 and 8.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may, in addition to controlling the HVAC system 4 under the direction of the thermostat, be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature−return air temperature)

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
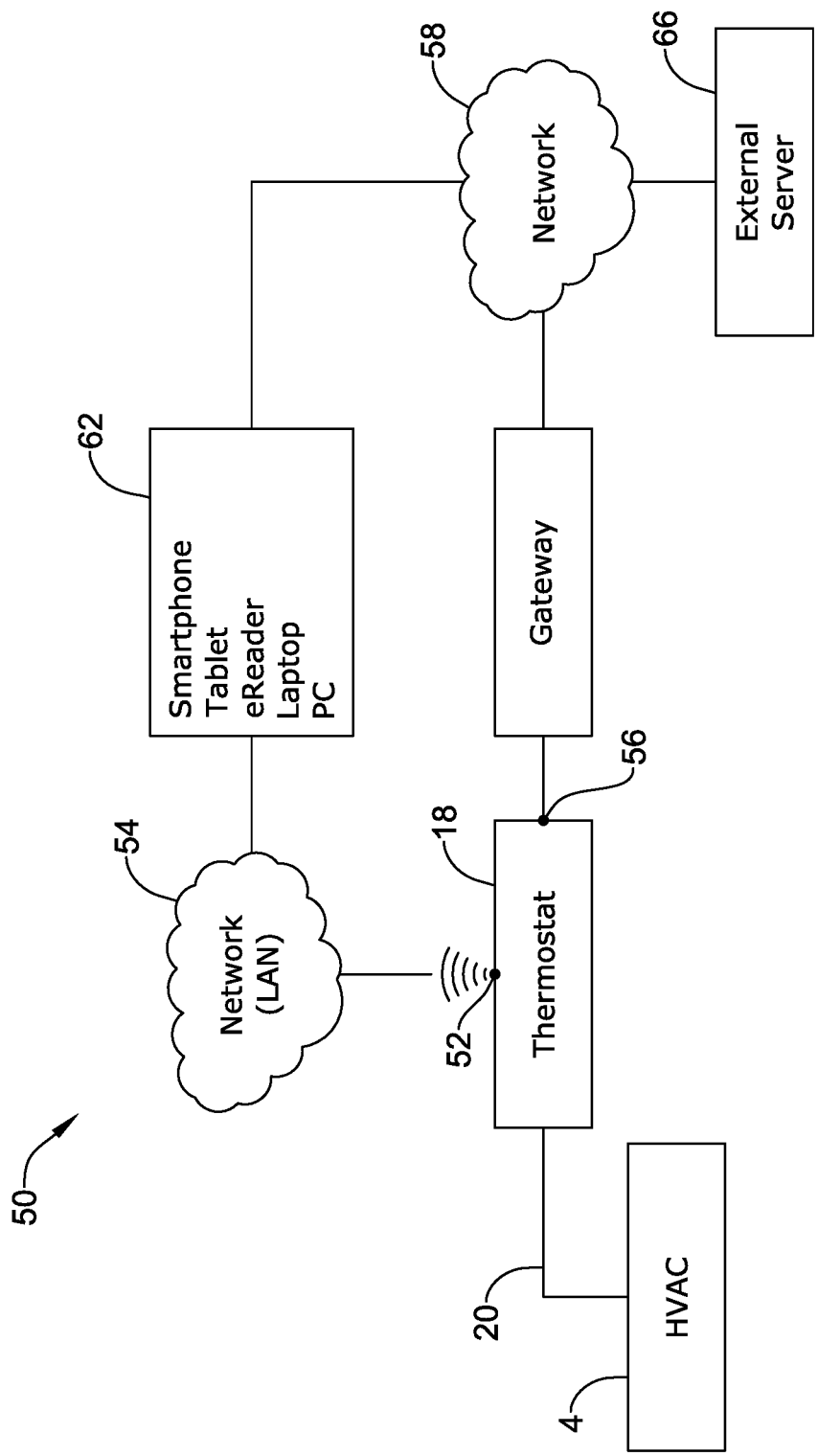
FIG. 2 is a schematic view of an illustrative HVAC control system that may facilitate access and/or control of an HVAC system of FIG. 1.

In some cases, the HVAC system 4 may be remotely controlled, but a remotely controlled HVAC system 4 is not required. In some cases, the HVAC system 4 may include an internet gateway or other device 23 that may allow one or more of the HVAC components, as described herein, to communicate over a wide area network (WAN) such as, for example, the Internet. FIG. 2 is a schematic view of an HVAC control system 50 that facilitates remote access and/or control of the HVAC system 4 shown in FIG. 1. The illustrative HVAC control system 50 includes an HVAC controller, as for example, HVAC controller 18 (see FIG. 1) that is configured to communicate with and control one or more HVAC components 6 of the HVAC system 4. As discussed above, the HVAC controller 18 may communicate with the one or more HVAC components 6 of the HVAC system 4 via a wired or wireless link. Additionally, the HVAC controller 18 may be adapted to communicate over one or more wired or wireless networks that may accommodate remote access and/or control of the HVAC controller 18 via another device such as a smart phone, tablet, e-reader, laptop computer, personal computer, key fob, or the like. As shown in FIG. 2, the HVAC controller 18 may include a first communications port 52 for communicating over a first network 54, and in some cases, a second communications port 56 for communicating over a second network 58. In some cases, the first network 54 may be a wireless local area network (LAN), and the second network 58 (when provided) may be a wide area network or global network (WAN)

including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

In some cases, the HVAC controller 18 may be programmed to communicate over the second network 58 with an external web service hosted by one or more external web server 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, fan set points, start times, end times, schedules, window frost protection settings, and/or the like from the web server 66 over the network 58. In some instances, the HVAC controller 18 may be configured to receive one or more user profiles having at least one operational parameter setting that is selected by and reflective of a user's preferences. In still other instances, the HVAC controller 18 may be configured to receive and/or download firmware and/or hardware updates such as, for example, device drivers from the web server 66 over the network 58. Additionally, the HVAC controller 18 may be configured to receive local weather data, weather alerts and/or warnings, major stock index ticker data, and/or news headlines over the second network 58. These are just some examples.

Depending upon the application and/or where the HVAC user is located, remote access and/or control of the HVAC controller 18 may be provided over the first network 54 and/or the second network 58. A variety of remote, wireless devices 62 may be used to access and/or control the HVAC controller 18 from a remote location (e.g. remote from the HVAC Controller 18) over the first network 54 and/or second network 58 including, but not limited to, mobile phones including smart phones, tablet computers, laptop or personal computers, wireless network-enabled key fobs, e-readers, and/or the like. In many cases, the remote, wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, an application program code (i.e. app) stored in the memory of the remote device 62 may be used to remotely access and/or control the HVAC controller 18. The application program code (app) may be provided for downloading from the external web service hosted by the external web server 66 (e.g. Honeywell's TOTAL CONNECT™ web service) to which the HVAC controller 18 may also be connected or another external web service (e.g. ITUNES® or Google Play). In some cases, the app may provide a remote user interface for interacting with the HVAC controller 18 at the user's remote device 62. For example, through the user interface provided by the app, a user may be able to change the operating schedule and operating parameter settings such as, for example, temperature set points, humidity set points, fan set points, start times, end times, schedules, window frost protection settings, accept software updates and/or the like. Communications may be routed from the user's remote device 62 to the web server 66 and then, from the web server 66 to the HVAC controller 18. In some cases, communications may flow in the opposite direction such as, for example, when a user interacts directly with the HVAC controller 18 to change an operating parameter setting such as, for example, a schedule change or a set point change. The change made at the HVAC controller 18 may then be routed to the web server 66 and then from the web server 66 to the remote device 62 where it may be reflected by the application program executed by the remote device 62. In other cases, a user may be able to interact with the HVAC controller 18 via a user interface provided by one or more web pages served up by the web server 66. The user may interact with the one or more web pages using a variety of internet capable devices to effect a change at the HVAC controller 18 as well as view usage data and energy consumption data related to the usage of the HVAC system 4. In still yet another case, communication may occur between the user's remote device 62 and the HVAC controller 18 without being relayed through a server. These are just some examples.

Figure 3:
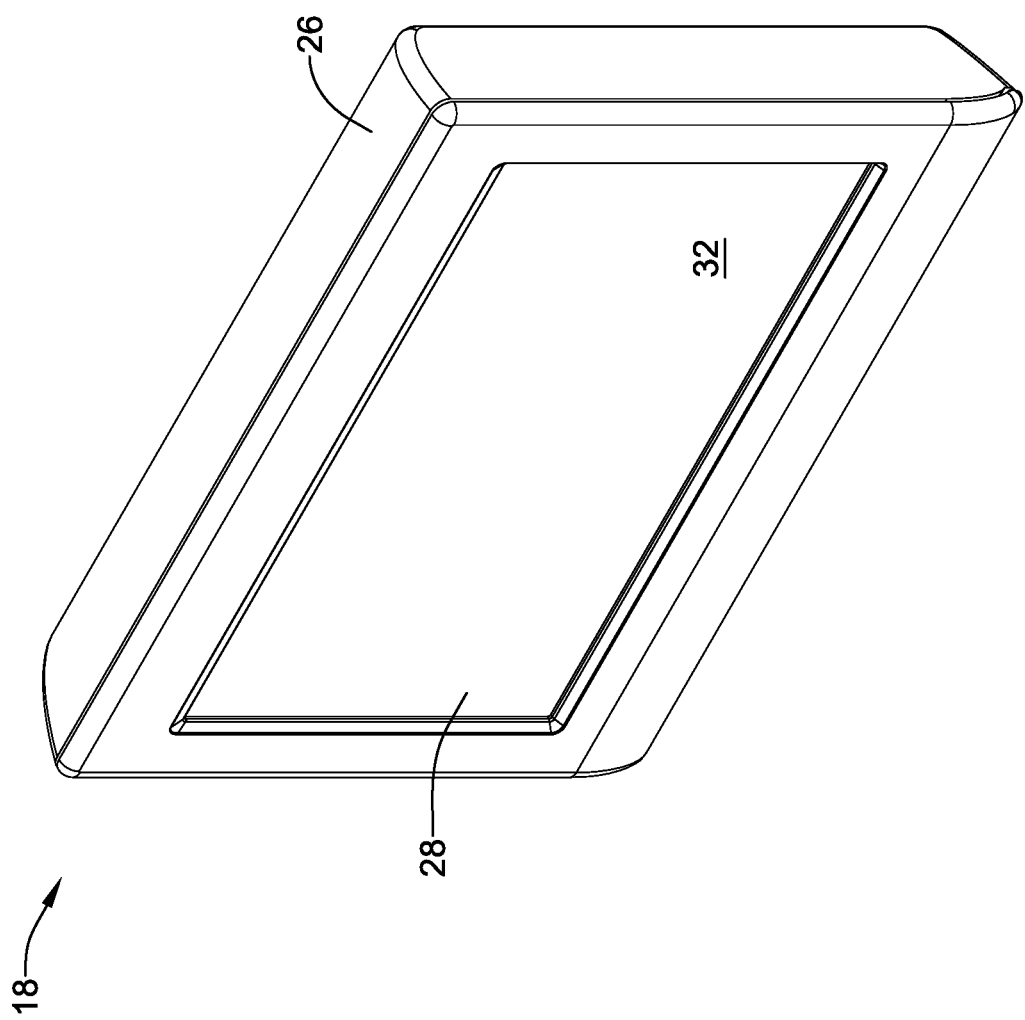
FIG. 3 is a schematic perspective view of an illustrative electronic assembly.

FIG. 3 depicts an illustrative HVAC controller 18 (e.g., a wall mountable thermostat). The HVAC controller 18 depicted in FIG. 3 may include a housing 26 and a display 28. In some cases, the display may be a liquid crystal display (LCD) screen and/or other display including one or more of a light emitting diode (LED) display, a fixed segment display, and so on. In some cases, the display 28 may include a touch sensitive screen 32, where both may be utilized as a user interface or part of a user interface of the HVAC controller 18 through which user input/selections may be provided.

Figure 4:
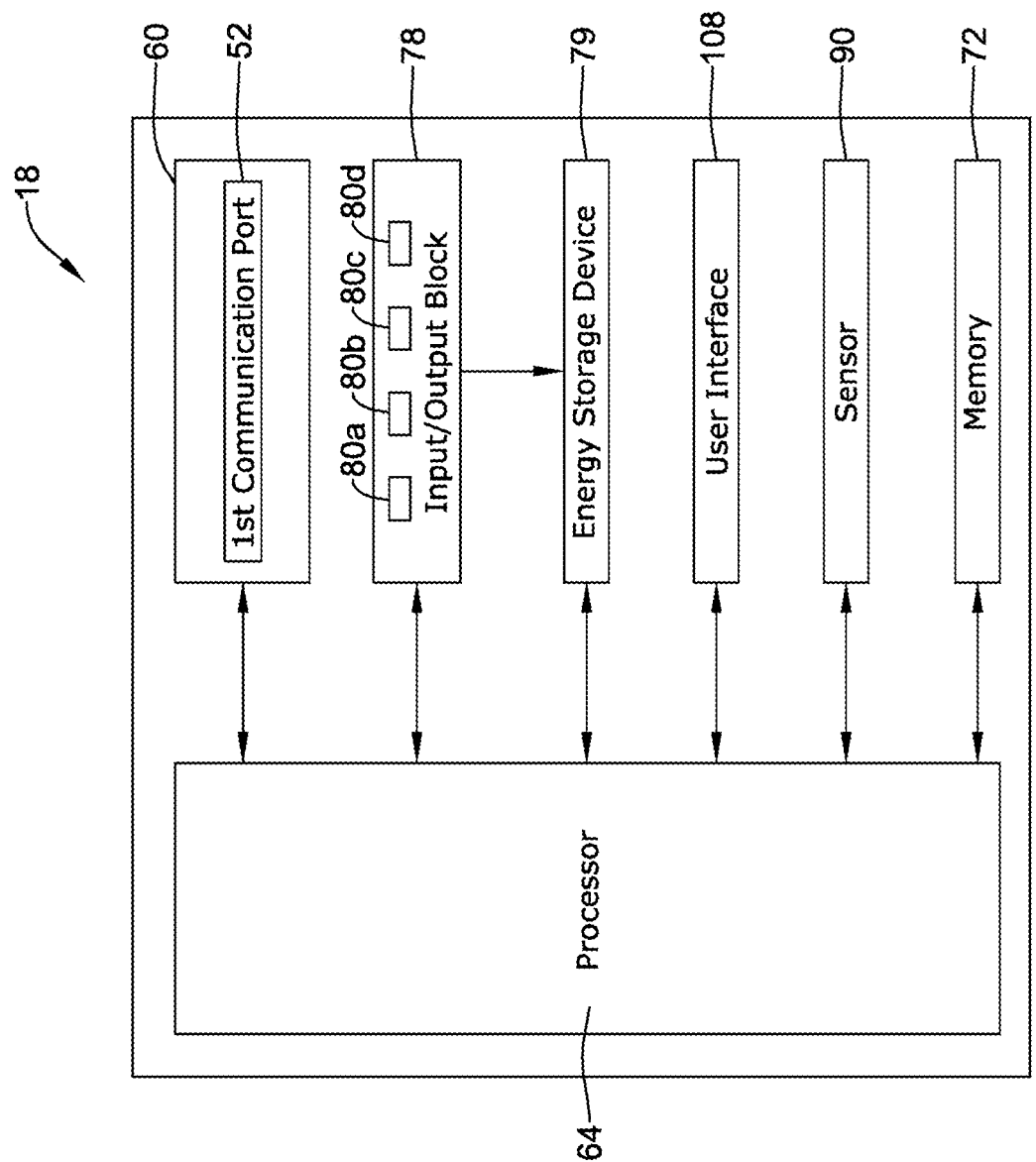
FIG. 4 is a schematic box diagram showing components of the illustrative electronic assembly of FIG. 3.

FIG. 4 is a schematic block diagram of an illustrative HVAC controller 18. As discussed above with reference to FIG. 2, the HVAC controller 18 may be accessed and/or controlled from a remote location over the first network 54 and/or the second network 58 using a remote wireless device 62 such as, for example, a smart phone, a tablet computer, a laptop or personal computer, a wireless network-enabled key fob, an e-reader, and/or the like. In some instances, the HVAC controller 18 may be a thermostat, but this is not required.

As shown in FIG. 4, the HVAC controller 18 may include a communications block 60 having a first communications port 52 for communicating over a first network (e.g. wireless LAN) and a second communications port 56 for communicating over a second network (e.g. WAN or the Internet), but this is not required. The first communications port 52 may be a wireless communications port including a wireless transceiver for wirelessly sending and/or receiving signals over a first wireless network 54. Similarly, the second communications port 56 may be a wireless communications port including a wireless transceiver for sending and/or receiving signals over a second wireless network 58. In some cases, the second communications port 56 may be in communication with a wired or wireless router or gateway for connecting to the second network, but this is not required. In some cases, the router or gateway may be integral to the HVAC controller 18 or may be provided as a separate device. Additionally, the illustrative HVAC controller 18 may include a processor or controller (e.g. microprocessor, microcontroller, etc.) 64 and a memory 72 operatively coupled to the processor or controller 64. The HVAC controller 18 may also include a user interface 108 operatively coupled to the processor or controller 64, but this is not required, where the user interface 108 may include the display 28 and/or touch sensitive screen 32. In some cases, HVAC controller 18 may include a timer (not shown). The timer may be integral to the processor 64 or may be provided as a separate component.

The memory 72 of the illustrative HVAC controller 18 may be in communication with the processor 64. The memory 72 may be used to store any desired information, such as the aforementioned control algorithm, set points, schedule times, diagnostic limits such as, for example, differential pressure limits, delta T limits, and the like. The memory 72 may be any suitable type of storage device including, but not limited to, RAM, ROM, EPROM, flash memory, a hard drive, and/or the like. In some cases, the processor 64 may store information within the memory 72, and may subsequently retrieve the stored information from the memory 72.

In many cases, the HVAC controller 18 includes an input/output block (I/O block) 78 having a number of wire terminals (e.g. 80a-80d) for receiving one or more field wires from the HVAC system 4 and for providing one or more control signals to the HVAC system 4. For example, the I/O block 78 may communicate with one or more HVAC components 6 and 8 of the HVAC system 4. The HVAC controller 18 may have any number of wire terminals for accepting a connection from one or more HVAC components 6 and 8 of the HVAC system 4. However, how many wire terminals are utilized and which terminals are wired is dependent upon the particular configuration of the HVAC system 4. Different HVAC systems 4 having different HVAC components 6 and/or type of HVAC components 6 and/or 8 may have different wiring configurations. As such, an I/O block having four wire terminals, as shown in FIG. 4, is just one example and is not intended to be limiting. Alternatively, or in addition, the I/O block 78 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device.

The I/O block 78 may communicate with an energy storage device 79 of the HVAC controller 18, as depicted in FIG. 4. The energy storage device 79 may communicate with the processor 64.

The HVAC controller 18 may also include one or more sensors 90 such as for example, a temperature sensor, a humidity sensor, an occupancy sensor, a proximity sensor, and/or the like. In some cases, the sensor(s) 90 of the HVAC controller 18 may include an internal temperature sensor, but this is not required. Alternatively, or in addition, the HVAC controller 18 may communicate with one or more remote temperature sensors, humidity sensors, occupancy sensors, and/or other sensors located throughout the building or structure. Additionally, the HVAC controller may communicate with a temperature sensor, humidity sensor, and/or other sensors located outside of the building or structure for sensing an outdoor temperature and/or humidity if desired. As depicted in FIG. 4, HVAC controller 18 may include energy storage device 79.

The user interface 108, when provided, may be any suitable user interface that permits the HVAC controller 18 to display and/or solicit information, as well as accept one or more user interactions with the HVAC controller 18. For example, the user interface 108 may permit a user to locally enter data such as temperature set points, humidity set points, fan set points, starting times, ending times, schedule times, diagnostic limits, responses to alerts, and the like. In one embodiment, the user interface 108 may be a physical user interface that is accessible at the HVAC controller 18, and may include a display 28 and/or a distinct keypad. The display may be any suitable display. In some instances, a display may include or may be a liquid crystal display (LCD), and in some cases an e-ink display, fixed segment display, or a dot matrix LCD display. In other cases, the user interface 108 may be a touch screen LCD panel that functions as both display and keypad. The touch screen LCD panel may be adapted to solicit values for a number of operating parameters and/or to receive such values, but this is not required. In still other cases, the user interface 108 may be a dynamic graphical user interface.

In some instances, the user interface 108 need not be physically accessible to a user at the HVAC controller 18. Instead or in addition, the user interface 108 may be a virtual user interface 108 that is accessible via the first network 54 and/or second network 58 using a mobile wireless device such as one of those remote devices 62 previously described herein. In some cases, the virtual user interface 108 may be provided by an app exacted by a user's remote device for the purposes of remotely interacting with the HVAC controller 18. Through the virtual user interface 108 provided by the app on the user's remote device 62, the user may make changes to temperature set points, humidity set points, fan set points, starting times, ending times, schedule times, diagnostic limits, respond to alerts, update their user profile, view energy usage data, and/or the like. Any changes made by a use to the HVAC controller 18 via a user interface 108 provided by an app on the user's remote device 62 may be first transmitted to an external web server 66. The external web server 66 may receive and accept any user inputs entered via the virtual user interface 108 provided by the app on the user's remote device 62, and associate the user inputs with a user's account on the external web service. If the user inputs include any changes to the existing control algorithm including any temperature set point changes, humidity set point changes, fan set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 58 to the HVAC controller 18 where it is received via the second port 56 and may be stored in the memory 72 for execution by the processor 64. In some cases, the user may observe the effect of their inputs at the HVAC controller 18.

In some cases, the virtual user interface 108 may include one or more web pages that are broadcasted over the second network 58 (e.g. WAN or the Internet) by an external web server (e.g. web server 66). The one or more web pages forming the virtual user interface 108 may be hosted by an external web service and associated with a user account having one or more user profiles. The external web server 66 may receive and accept any user inputs entered via the virtual user interface and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 58 to the HVAC controller 18 where it is received via the second port 56 and may be stored in the memory 72 for execution by the processor 64. In some cases, the user may observe the effect of their inputs entered via the one or more web pages forming the virtual user interface 108 at the HVAC controller 18.

In some cases, a user may utilize either the user interface 108 provided at the HVAC controller 18 and/or a virtual user interface 108 as described herein. The two types of user interfaces 108 that may be used to interact with the HVAC controller 18 are not mutually exclusive of one another. However, in some cases, a virtual user interface 108 may provide more advanced capabilities to the user.

As discussed above, the HVAC system 4 may be utilized to perform dehumidification of a home or building (e.g., building 2). When performing dehumidification, cooling equipment of the HVAC system 4 may be utilized. In some cases, the fan 22 may be a multi-speed fan (e.g., a two-speed fan having a low fan speed and a high fan speed or other fan having a different number of speeds). The multi-speed fan may switch from a lower fan speed to a higher fan speed and vice versa during dehumidification. In one example, the HVAC controller 18 and/or other electronic assembly (e.g., EIM 34, the remote server 66, wireless device 62, etc.) may monitor a cooling load of the HVAC system 4 and adjust the fan speed of the multi-speed fan based, at least in part, on the monitored cooling load.

Figure 5:
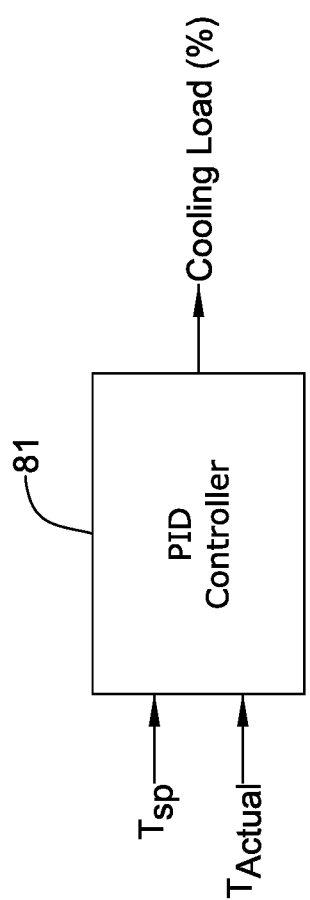
FIG. 5 is a schematic diagram depicting inputs and output from a proportional integral derivative controller used by a processor/controller of an electronic assembly.

The HVAC controller 18 or other electronic assembly may be configured to determine a cooling load of the cooling system of the HVAC system 4. In one example, the HVAC controller 18 may include a proportional integral derivative (PID) controller 81 that may be configured to output a cooling load (e.g., a percentage cooling load) on the cooling system based, at least in part, on a temperature set point, $T_{sp}$, and an actual or measured temperature, $T_{actual}$, such as depicted in FIG. 5. When the cooling system 8 is not able to maintain the inside temperature $T_{actual}$ at the temperature set point $T_{sp}$, the proportional term of the PID controller 81 may be non-zero and may provide a measure of the cooling load on the cooling system, sometimes in combination with the integral and/or derivative terms of the PID controller 81. Even when the cooling system 8 is maintaining the inside temperature $T_{actual}$ at the temperature set point $T_{sp}$ (e.g. the proportional term of the PID controller 81 is low), the integral and/or derivative terms of the PID controller 81 may provide a measure of the cooling load on the cooling system. Although, a PID controller 81 may be used in the example, other controller types may be utilized and/or a load on a cooling system may be determined or identified in one or more other manners. For example, the current duty cycle or "on time" of the cooling system 8 may be used to provide a measure of the cooling load on the cooling system.

When performing dehumidification inside of a building 2, cooling equipment 8 may be used to dehumidify the space. To reduce the humidity level in the building 2, the speed of a multi-speed fan 22 may be reduced, which slows the flow of air across the cooling coils 11, which lowers the temperature of the air and increases the condensation of water from the air. The result is conditioned air that is cooler and less humid than if the multi-speed fan 22 were operated at a higher fan speed. A difficulty that can occur in such systems is that when operating at the lower fan speed to reduce humidity, the fan speed is too low to effectively drive conditioned air to the far reaches of the building 2. This can leave some areas of the building 2 not sufficiently cooled and thus uncomfortable to the occupants. This undesirable effect can increase as the cooling load on the building 2 increases. To help alleviate this, during dehumidification, the current cooling load on the cooling system 8 may be identified, as described herein, and the fan speed may be adjusted to a higher fan speed as the identified current cooling load goes up. The cooling load on the building 2 may go up, for example, when moving from the morning hours to the afternoon hours during a day. In some cases, the fan speed may be adjusted to a higher fan speed when the current cooling load rises above a cooling load threshold. In some cases, the cooling load threshold may be dependent at least in part on a user specified high fan speed priority setting. If the cooling load on the building subsequently decreases, such as when moving from the afternoon hours to the evening hours, the fan speed may be adjusted downward to increase dehumidification.

Figure 6:
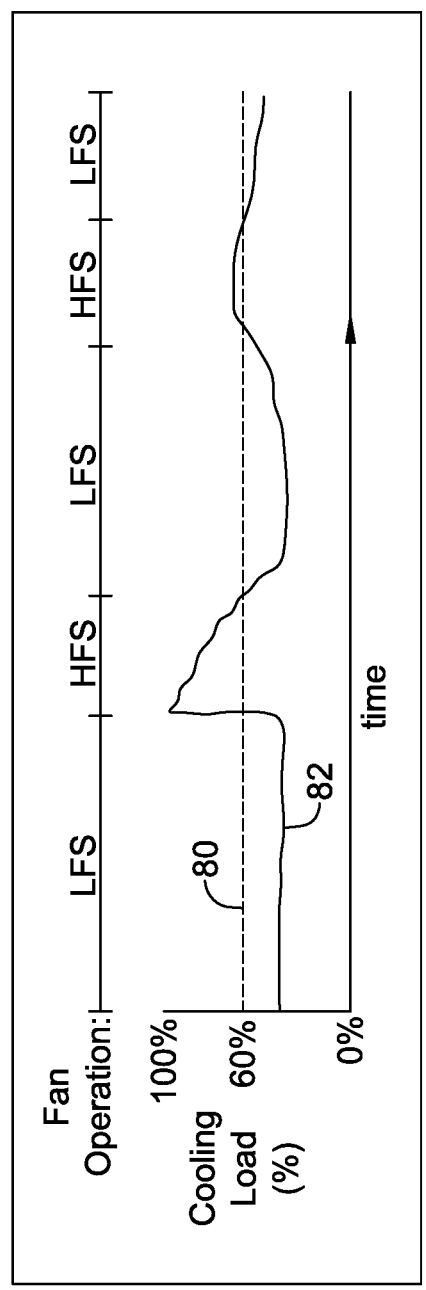
FIG. 6 is a graph representing an illustrative fan speed based on a cooling load of a cooling system over time.

FIG. 6 depicts a graph showing the concept of controlling a fan speed based on a cooling load (e.g., cooling load as a percent of max cooling load) over time. In FIG. 6, a cooling load threshold 80 (e.g., the dotted line) is set at 60% of the maximum cooling capacity of the cooling system 8. When the measured cooling load 82 in FIG. 6 (e.g., the solid line) is below the cooling load threshold 80, the HVAC controller 18 may be configured to run the fan on a lower fan speed (LFS) to increase the dehumidification produced by the cooling system 8. If the measured cooling load 82 is identified as going beyond the cooling load threshold 80, the HVAC controller 18 may be configured to run the fan at a higher fan speed (HFS) to more effectively drive conditioned air to the far reaches of the building 2. The HVAC controller 18 may be configured to run the fan on higher fan speed until the measured cooling load 82 is determined to fall below the cooling load threshold 80, at which point the HVAC controller 18 may be configured to place the fan in the lower fan speed. The concept, disclosed herein, of adjusting a fan speed of a multi-speed fan 22 based, at least in part, on a cooling load of an HVAC system 4 may help maintain comfort in the space at higher cooling loads at the expense of lower dehumidification, while allowing increased dehumidification at lower cooling loads.

The concept of adjusting a fan speed of a multi-speed fan 22 based, at least in part, on a cooling load of an HVAC system 4 may be used when the HVAC system 4 enters a dehumidification mode. Typically, the HVAC system 4 may enter a dehumidification mode when a humidity measurement (e.g., from a humidity sensor) exceeds a humidity set point and/or in response to one or more other triggers. Additionally or alternatively, the concept of adjusting a fan speed of a multi-speed fan 22 based, at least in part, on a cooling load of the HVAC system 4 may be utilized to dehumidify and/or improve comfort in a space without regard for whether the HVAC system 4 is in a dehumidification mode and thus, the multi-speed fan 22 may be adjusted by the HVAC controller 18 from a lower fan speed to a higher fan speed and vice versa whenever a cooling load on the HVAC system 4 crosses a cooling load set point (e.g., a cooling load set point based on a fan speed threshold or high fan speed priority setting, as discussed below).

Figure 7:
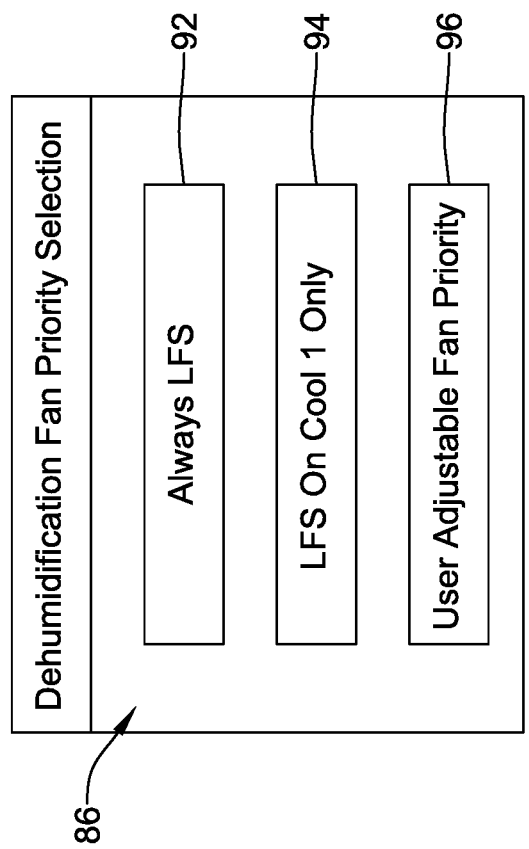
FIG. 7 is a schematic view of a dehumidification fan priority selection screen.

In some cases, the fan speed threshold may be customized by a user for a specific building or space. In one example, a user (e.g., an installer or other user) may be able to select a dehumidification fan speed priority and/or a high fan speed priority setting through the HVAC controller 18 or other electronic assembly in communication with the HVAC controller 18. Such selections may be made by a user when the HVAC controller 18 is installed and/or at a different time. FIG. 7 is an illustrative dehumidification fan priority selection screen 86 configured to be displayed on the display 28 of an HVAC controller 18 or remote device 62 in communication with the HVAC controller 18. In some cases, the dehumidification fan priority selection may display selectable options (e.g., a physical or virtual button on the display 28) for selection (e.g., via touch sensitive screen 32 or other user interface) by a user to set a fan priority when the HVAC system 4 is in a dehumidification mode. In one example, a first selectable option 92, ALWAYS LOW FAN SPEED (LFS), may allow a user to set fan priority during humidification to always run the fan at a low fan speed, regardless of the cooling load. A second selectable option 94, LFS ON COOL STAGE 1 ONLY, may allow a user to set a fan priority during dehumidification to run the fan at a low fan speed when a multi-stage cooling system of the HVAC system 4 is only running stage 1. Higher fan speeds are allowed when more than one cooling stages are active. A third selectable option 96, USER ADJUSTABLE FAN PRIORITY, may allow a user to set a high fan speed priority setting during dehumidification to run the fan at a lower fan speed/higher fan speed depending on the current cooling load of the cooling system 8 of the HVAC system 4. Although three options are described with respect to screen 86 in FIG. 7, fewer or more options may be displayed as well as similar or different options for selecting a fan priority setting during dehumidification.

After selecting the USER ADJUSTABLE FAN PRIORITY button or option (e.g., the third selectable option 96 in the example of FIG. 7), a user may be presented with one or more options for selecting a high fan speed priority setting. A user may select a high fan speed priority setting by selecting a value within a range. Once a value has been selected, the HVAC controller 18 (e.g., the processor or controller 64 thereof) or other device in communication with the HVAC controller 18 may determine a cooling load threshold based at least in part on the selected value and may determine whether to operate the multi-speed fan 22 of HVAC system 4 at a lower fan speed or a higher fan speed based, at least in part, on the current cooling load and the selected high fan speed priority setting. For example, if a user selects the lowest value within the range (e.g., gives the high fan speed the least priority possible), the HVAC controller 18 or other device in communication with the HVAC controller 18 may set the cooling load threshold to 100% before the HVAC controller 18 would adjust the fan to a high fan speed and as a result, the fan will operate at a low fan speed virtually all of the time during dehumidification. In contrast, if a user selects the highest value within the range (e.g., gives the high fan speed the greatest priority possible), the HVAC controller 18 or other device in communication with the HVAC controller 18 may set the cooling load threshold to 0% and as a result, the fan will operate at a high fan speed virtually all of the time during dehumidification. All options for selection within the range between the lowest value and the highest value may be linearly proportional (e.g., inversely or directly proportional) to the cooling load on the HVAC system 4 and/or have a different inverse or direct relationship with respect to the cooling load on the HVAC system 4.

Users may be able to adjust the high fan speed priority setting based on their specific HVAC system 4, the specific building at hand, the regional weather conditions, etc. In some cases, user preferences and/or the operation of the HVAC system 4 may change over time and thus, a user may adjust the dehumidification fan speed priority setting accordingly. In some cases, the user may enter a schedule for the dehumidification fan speed priority settings, where different dehumidification fan speed priority settings are applied during different parts of a day, a week or year, as desired.

Figure 8:
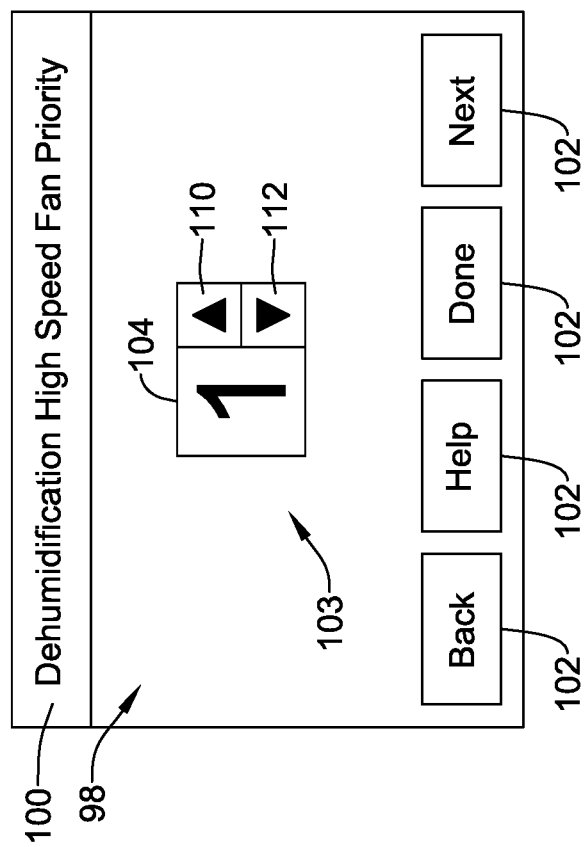
FIGS. 8 and 9 are alternative schematic views of high fan speed priority setting screens for display on a display of an electronic assembly, such as the electronic assembly of FIGS. 3-4.
Figure 9:
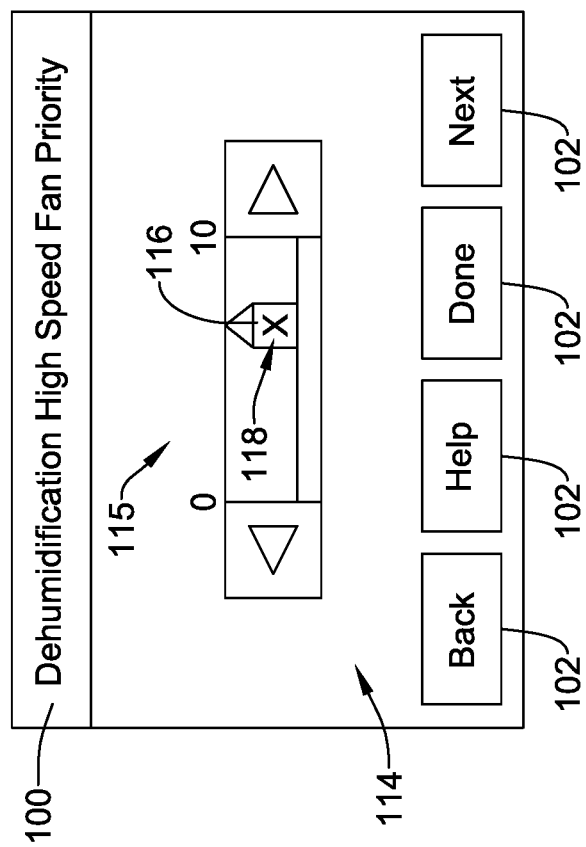

FIGS. 8 and 9 depict alternate screens for selecting a dehumidification fan speed priority settings. The screens in FIGS. 8 and 9 may be displayed on a display 28 of an HVAC controller 18 or a display of a device in communication with the HVAC controller in response to selecting option 96 shown in FIG. 7. FIG. 8 is an example dehumidification high fan speed priority selection screen 98. Screen 98 may include a heading or title bar 100 at a top of the screen 98 and one or more selectable buttons or options 102 at a bottom or at one or more other locations on the screen 98. In some cases, there may be four selectable buttons or options 102, but fewer or more buttons or options 102 may be provided as desired. The selectable buttons or options 102, may include one or more of a BACK button selectable to return to a prior screen, a HELP button selectable for assistance, a DONE button selectable to complete a selection, a NEXT button selectable to move on to the a next step, and/or one or more other selectable buttons. Further, screen 98 may include a dehumidification high fan speed priority setting selector 103 having a setting box 104 that depicts which value from a range of values is selected for the dehumidification high fan speed priority setting. To select the setting, the dehumidification high fan speed priority setting selector 103 of screen 98 may include a selectable up arrow 110 and/or a selectable down arrow 112 to adjust the value in the setting box 104 up and down within a predetermined range of values.

In the alternative example dehumidification high fan speed priority selection screen 114 of FIG. 9, a heading or title bar 100 and one or more selectable options 102 may be displayed in a manner similar to how the heading or title bar 100 and the one or more selectable options 102 may be displayed in screen 98 of FIG. 8. Alternatively, screen 114 may include a different layout for the heading or title bar 100 and/or selectable options 102, may not include one or more of the heading or title bar 100 and/or selectable options 102, and/or may include other buttons or features. Screen 114 differs from screen 98 at least in how a value is selected for the dehumidification high fan speed priority setting. In FIG. 9, screen 114 may have a dehumidification high fan speed priority setting selector 115 that may include a slide bar 116 that may be slid from side to side (or up and down) to adjust the dehumidification high fan speed priority setting. In some instances, a setting value 118 may be displayed on the slide bar and may adjust as the slide bar is slid along a range of values, but this is not required. In some cases, a setting 118 may be displayed at other locations of screen 114.

In one example, a range of values from which a dehumidification high fan speed priority setting may be set may include values from zero (0) to ten (10). In such a case, if a user selects four (4) via a dehumidification high fan speed priority setting selector, the HVAC controller 18 or other device in communication with the HVAC controller 18 may switch from a lower fan speed to a higher fan speed when a cooling load on the HVAC system 4 is at or higher than 60% of the maximum cooling load. This number may be determined from the following equation: 100%−([Dehumidification High Fan Speed Priority Setting]*10%)=cooling load threshold in % of maximum cooling load. If a user is experiencing parts of the building that are not cooled sufficiently and are thus uncomfortable, a user may increase the dehumidification high fan speed priority setting to, for example, a value of seven (7). When the user sets the dehumidification high fan speed priority to seven (7) via the dehumidification high fan speed priority setting selector 103, 115, the HVAC controller 18 may set the fan speed to a higher fan speed whenever the cooling load of the HVAC system 4 is at 30% or greater of the maximum cooling load for the HVAC system 4, as calculated by the above equation. In this example, the dehumidification high fan speed priority setting may result in the HVAC controller 18 operating the multi-speed fan 22 at a high fan speed even though the HVAC system 4 (e.g., cooling system 8 thereof) may be able to satisfy the low cooling load at a lower fan speed. However, the increased fan speed may allow the HVAC system 4 to more effectively drive conditioned air to the far reaches of the building.

Figure 10:
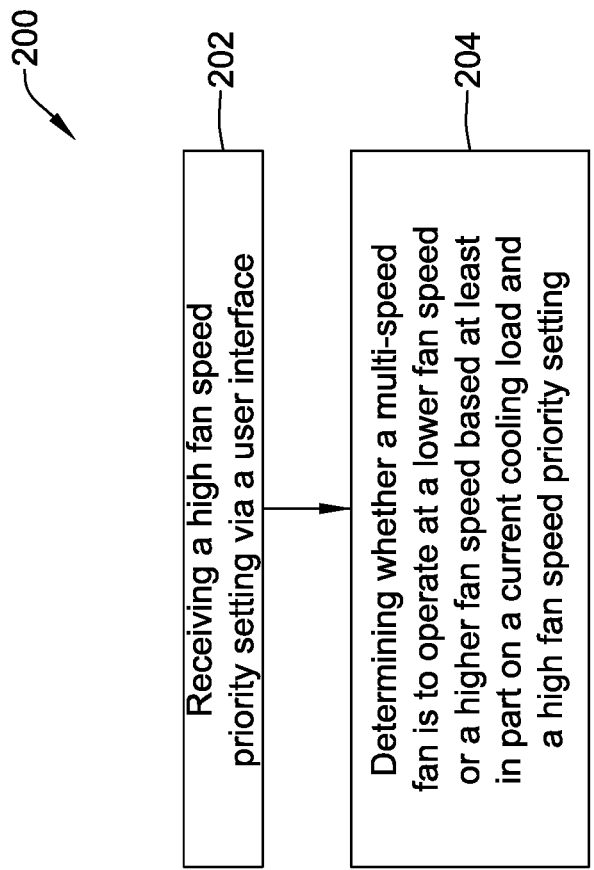
FIG. 10 is a flow diagram showing an illustrative method of using the electronic assemblies disclosed herein.

In operation, the system disclosed herein may be used in a method 200 of adjusting a fan speed of a multi-speed fan (e.g., a two speed fan having a low fan speed and a high fan speed) of a cooling system 8 of a building 2. In the example method shown in FIG. 10, a dehumidification high fan speed priority setting selector 103, 115 may be displayed on a display 28 of the HVAC controller 18 or device in communication with the HVAC controller 18. Then at step 202, the HVAC controller 18 or other device in communication with the HVAC controller 18 may receive a dehumidification high fan speed priority setting via the dehumidification high fan speed priority setting selector 103, 115 displayed on a user interface of the HVAC controller 18 or other device in communication with the HVAC controller 18. Once a dehumidification high fan speed priority setting is received, the HVAC controller 18 may determine 204 whether a multi-speed fan is to operate at a lower fan speed or a higher fan speed based at least in part on a current cooling load on an HVAC system 4 and/or the received dehumidification high fan speed priority setting.

In a dehumidification mode of the HVAC system 4, the HVAC controller 18 may operate the multi-speed fan at a lower fan speed to help reduce the humidity level in the building until the current cooling load on the HVAC system 4 reaches a cooling load threshold. The cooling load threshold may be based at least in part on the received dehumidification high fan speed priority setting. This illustrative method may operate the multi-speed fan at a higher fan speed for at least one cooling load for a higher dehumidification high fan speed priority setting than for a lower dehumidification high fan speed priority setting. This illustrative method may also operate the multi-speed fan at a higher fan speed than is necessary for the cooling system to satisfy a cooling load for at least one dehumidification high fan speed priority setting (e.g., when the high fan speed priority setting value is a six or above in a range of zero through ten).

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of adjusting a fan speed of a multi-speed fan of a cooling system of a building, the method comprising:
    receiving a high fan speed priority setting value from a user to control the fan speed of the multi-speed fan in a dehumidification mode, via a user interface, where the high fan speed priority setting value is selected from a range of values, wherein:
        in response to receiving the high fan speed priority setting value from the range of values via the user interface, setting, by a controller operably connected to the user interface, a cooling load threshold that is inversely proportional to the high fan speed priority setting value and operating the multi-speed fan at a first fan speed or a second fan speed based at least in part on the high fan speed priority setting value, a current cooling load of the building on the cooling system and the cooling load threshold, and
    determining whether the multi-speed fan is to operate at the first fan speed or the second fan speed based at least in part on the current cooling load on the cooling system relative to the cooling load threshold, wherein the second fan speed is a higher fan speed than the first fan speed;
    in response to the cooling load on the current cooling system matching or exceeding the cooling load threshold switching, by the controller, the multi-speed fan from the first fan speed to the second fan speed.

2. The method of claim 1, further comprising:
    displaying a high fan speed priority setting value selector on the user interface; and
    receiving the high fan speed priority setting value via manipulation, of the user interface, by a user of the high fan speed priority setting selector.

3. The method of claim 2, wherein the high fan speed priority setting value selector allows a user to select the high fan speed priority setting value from the range of values, where the range of values is between 0 and 10 and where the controller uses the high fan speed priority setting value to set the cooling load threshold where the multi-speed fan will switch between the first fan speed and the second fan speed.

4. The method of claim 1, wherein setting the cooling load threshold comprises setting the cooling load threshold using an algorithm that multiplies the high fan speed priority setting value by 10 and subtracts it from 100.

5. A Heating, Ventilation, and/or Air Conditioning (HVAC) controller configured to adjust a fan speed of a dual speed fan of an HVAC system of a building between a low fan speed and a high fan speed, the HVAC controller comprising:
    a user interface configured to:
        display a dehumidification fan priority selection screen;
        receive a high fan speed priority setting value from a range of values via the dehumidification fan priority selection screen;
    a controller operatively coupled to the user interface, the controller configured to:
        set a cooling load threshold at 100% and decrease the cooling load threshold by the high fan speed priority setting value multiplied by 10%;
        identify a current cooling load on a cooling system of the HVAC system;
        adjust the fan speed of the dual speed fan to the high fan speed when the identified current cooling load on the cooling system equals or exceeds the set cooling load threshold; and
        adjust the fan speed of the dual speed fan to the low fan speed when the identified current cooling load on the cooling system does not equal or exceed the set cooling load threshold, to operate in a dehumidification mode.

6. The HVAC controller of claim 5, wherein:
the user interface includes a display; and
the controller is further configured to display a high fan speed priority setting selector on the display.

7. The HVAC controller of claim 6, wherein the high fan speed priority setting value selector is configured to accept from the user the high fan speed priority setting value from the range of values, where the range of values is between zero and ten.

8. The HVAC controller of claim 5, wherein the controller is further configured to determine whether to operate the dual speed fan at the low fan speed or the high fan speed based solely on the identified current cooling load on the set cooling system relative to the cooling load threshold.

9. The HVAC controller of claim 5, wherein the controller is further configured to:
operate the dual speed fan at the high fan speed for at least one cooling load when the high fan speed priority setting value is at an increased high fan speed priority setting value; and
operate the dual speed fan at the low fan speed for the at least one cooling load when the high fan speed priority setting value is at a lowered high fan speed priority setting value.

10. An electronic assembly configured to adjust a fan speed of a multi-speed fan of a cooling system of a building, the electronic assembly comprising:
a user interface configured to receive a high fan speed priority setting value from a user to control the fan speed of the multi-speed fan in a dehumidification mode, where the high fan speed priority setting value is selected from a range of values;
a controller operably connected to the user interface and configured to:
in response to receiving the high fan speed priority setting value from the user, modify a cooling load threshold that is inversely proportional to the high fan speed priority setting value and operate the multi-speed fan at a first fan speed or a second fan speed based at least in part on the high fan speed priority setting value, a current cooling load of the building on the cooling system, and the cooling load threshold;
in response to receiving a lower high fan speed priority setting value comprising a low priority in the range of values for a high fan speed priority setting value that also raises the cooling load threshold, operate the multi-speed fan at the first fan speed until the current cooling load rises to the raised cooling threshold, and
in response to receiving a larger high fan speed priority setting value comprising a high priority in the range of values for the high fan speed priority setting value that also lowers the cooling load threshold, operate the multi-speed fan at the first fan speed until the current cooling load rises to the lowered cooling threshold,
wherein the second fan speed is a higher fan speed than the first fan speed.

11. The electronic assembly of claim 10, wherein:
the user interface includes a display; and
the controller is further configured to display a high fan speed priority setting value selector on the display.

12. The electronic assembly of claim 11, wherein the high fan speed priority setting value selector is configured to accept from the user, the high fan speed priority setting value from the range of values, where the range of values is between zero and ten.

13. The electronic assembly of claim 12, wherein in response to the user inputting the high fan speed priority setting value, the controller is configured to determine the cooling load threshold using an algorithm where the high fan speed priority setting value is multiplied by 10 and subtracted from 100.

14. The electronic assembly of claim 10, wherein the determination of whether to operate the multi-speed fan at the first fan speed or the second fan speed is based solely on the current cooling load on the cooling system relative to the cooling load threshold.

* * * * *

UNITED STATES PATENT AND TRADEMARK OFFICE
CERTIFICATE OF CORRECTION

PATENT NO. : 10,955,164 B2
APPLICATION NO. : 15/210525
DATED : March 23, 2021
INVENTOR(S) : Aaron Klein, Robert J. Schnell and David Schultz It is certified that error appears in the above-identified patent and that said Letters Patent is hereby corrected as shown below:

In the Claims

Column 17, Line 16-17 (Claim 8): Replace "...load on the set cooling system relative to the cooling load threshold..." with --...load on the cooling system relative to the set cooling load threshold...--

Signed and Sealed this
Nineteenth Day of July, 2022

Katherine Kelly Vidal
*Director of the United States Patent and Trademark Office*